Patented Oct. 10, 1922.

1,431,525

UNITED STATES PATENT OFFICE.

CHARLES HOFFMAN, OF TUCKAHOE, HARRY DAVETT GRIGSBY, OF BROOKLYN, AND NATHAN MINTON CREGOR, OF NEW YORK, N. Y., ASSIGNORS TO WARD BAKING COMPANY, OF NEW YORK, N. Y., A CORPORATION OF NEW YORK.

MANUFACTURE OF LEAVENED BREAD.

No Drawing.  Application filed October 1, 1921.  Serial No. 504,692.

*To all whom it may concern:*

Be it known that we, CHARLES HOFFMAN, HARRY DAVETT GRIGSBY, and NATHAN MINTON CREGOR, residing at, respectively, 137 Bella Vista Avenue, Tuckahoe, State of New York, No. 105 Quincy Avenue, Brooklyn, New York, and No. 26 West 83rd Street, New York city, New York, have invented certain new and useful Improvements in the Manufacture of Leavened Bread; and we do hereby declare the following to be a full, clear, and exact description of the invention, such as will enable others skilled in the art to which it appertains to make and use the same.

In the manufacture of leavened bread, in accordance with the best existing commercial practice, the dough batch is made up of customary ingredients, that is to say, flour, water, milk, sugar, vegetable oil or other shortening, yeast, and, preferably, yeast food of some kind to stimulate the growth of the yeast and mature the gluten of the flour employed.

The finished loaf of bread made from such a dough batch contains but a moderate amount of vitamines, and, for that reason, is insufficient, if used as a single article of diet, to provide for normal growth or even to provide for the maintenance of health. Butter spread upon slices of bread supplements to an appreciable degree the deficiency in fat-soluble A vitamines, but the deficiency of water-soluble B vitamines has no compensation from butter; so that buttered bread itself is not of itself a completely-balanced food, even taking into consideration the milk, sugar, and shortening employed in the dough batch from which the bread is made.

One of the purposes of the present invention is to supply this defect in the finished loaf of bread by a procedure which will give to the loaf a rich water-soluble B vitamine content.

The present invention, therefore, solves a problem of the greatest importance to the bread industry, and also a problem of far-reaching sociological moment, inasmuch, as will hereinafter appear, the procedure whereby the result is attained is one which utilizes as one of the ingredients of the dough batch a material readily derivable from byproducts abundantly available at very moderate cost, which material may be substituted pound for pound for the sugars usually employed in bread making; so that the new loaf of bread, with its remarkably greater food-value and with its other superior qualities (which will be hereinafter referred to), may be put upon the market at practically the same price as the ordinary loaf.

The material hereinbefore referred to, which is capable of being substituted pound for pound for the sugars usually employed in bread making and which serves as a carrier for a rich content of water-soluble B vitamines, may be produced, as hereinbefore noted, from cheap by-products. Prominent among these by-products are what are known as "rice polishings," wheat bran, and, to especial advantage, the germs of cereals, for instance, (1) wheat germs, which like wheat bran, are a by-product of the manufacture of wheat flour, and (2) maize germs which are a by-product of the manufacture of various products, (such as hominy, "corn" flours and "corn' meal) from so-called "Indian corn" or maize.

In the polishing of rice, the germ and branny material is removed during the polishing operation and is collected as a brownish product which is known as "rice polishings." It is high in mineral salts, fairly high in protein and contains a large amount of water-soluble B vitamines.

In the manufacture of wheat flours by the roller process of milling, there is formed, in addition to the branny material constituting the main body of the by-product, a separate or additional by-product containing the germ of the wheat and known commercially as "wheat germ." It contains usually from 5 to 40 per cent of bran and about 10 per cent of fine particles of flour, the remainder being the pure germ. The percentage of bran present in this commercial "wheat germ" varies with the prevailing practice in individual mills, some mills producing a germ almost free from bran and others producing a germ containing varying quantities of bran up to about 40 per cent as above noted.

In the manufacture of hominy, "corn" flour and "corn" meal from "Indian corn" or maize, there results a by-product consisting mainly of the pure "corn" germ or maize germ.

The cereal germs, and particularly the wheat germ and maize germ, are high in mineral salts and protein and rich in water-soluble B vitamines. Like rice polishings, they are by-products obtainable in large quantity and at a low price.

The raw materials (i. e. the rice polishings, wheat germs, maize germs, or the like, either alone or in admixture) are first freed from their vegetable fat by an extraction process, a suitable extracting agent for the purpose being benzol or carbon tetrachloride, each of which is available economically because of its low cost, efficiency, and ready regeneration. Any other suitable extracting agent may be employed, although either of the ones above specified, and particularly benzol, are preferred for the reasons given, and, also because both of these solvents serve to extract practically all of the coloring matter from the raw material, and thus produce a product of lighter color, which will not materially, if at all interfere with the desired whiteness of the loaf of bread in which it is ultimately to be used. Crushed or ground roasted peanuts, or the like, high in protein, may be incorporated in the batch if desired and are likewise freed from their oil in the extracting operation.

After regeneration of the solvent, the extracted oil may be utilized in the manufacture of soap, or otherwise, either with or without preliminary hyrogenation. The extraction of the oil is found, in most instances, to be accompanied with the extraction of certain bitter or acrid substances present in the raw material and which, unless thus removed, would be corresopndingly objectionable in the product and in the bread in which it is to be employed.

After the extraction of the oil, the raw material or materials employed are cooked with say ten times their weight of water so as to throughly gelantinize the starch contained in them.

The cooked mixture is then cooled down to about one hudred degrees Fahrenheit and an infusion of barley malt is then added. The infusion of barley malt or malt flour used to malt the cooked mixture is obtained from a batch of from five to thirty (preferably ten) per cent by weight of malt—calculated upon the solids present in the cooked mixture of the raw materials from which the oil has been extracted. The amount of malt infusion added should be sufficient to supply enough diastase to ultimately effect solution of the starches present and their conversion into sugars (maltose and dextrins.)

The temperature of the mixture of cooked raw material and malt infusion is then maintained at 100°–120° Fahrenheit for from two to three hours. During this period whatever proteolytic enzymes are present bring about the solution of a considerable proportion of the proteins in the batch and the starches present are largely brought into solution by the diastase of the malt. The temperature is then raised to approximately 154° Fahrenheit for from say fifteen to twenty minutes to permit completion of the solution of the starches by the diastase of the malt. Then the temperature is raised slowly, during a period of say fifteen minutes, up to approximately 170° Fahrenheit, and then more rapidly to the boiling point to destroy any enzymes present.

The wheat germ is naturally acid and this acidity likewise exists in the extract and is favorable thereto. If, in any instance, the extract, after malting, does not show acidity it is preferable to add sufficient acid thereto to give a distinct acid reaction just before filtration and consequently, before concentration, both of which are facilitated by the presence of a small quantity of acid in the extract.

The digestion above described is best accomplished in a beer mash-tun or similar apparatus provided with suitable stirrers and with a suitable steam-heating jacket or other appropriate beating means.

After digestion, the liquid is tapped from the bottom, and is thus strained clear by the insoluble residue acting as a filter; or, it is filtered clear by a filter press, or by any other suitable apparatus or method. The residue is finally washed free of soluble material, and the washings thus obtained are added to the initial clear extract and together with it are concentrated in a vacuum evaporating apparatus and finally brought to dryness in a vacuum drum drier or other drying device capable of drying the product without discoloring it by the heat applied.

In the case of rice polishings, the ultimate product is a light yellow crystalline material quickly soluble in water to a clear solution. It has the following approximate analysis: 5% mineral salts, 6% to 8% soluble protein, the remainder being largely carbohydrates, (maltose and dextrins). This product also contains approximately all of the water-soluble B vitamines of the original rice polishings used as the starting material.

When "corn" germ (i. e. maize germ) is used as the starting material, the approximate formula of the product is as follows: 5% to 6% mineral salts, 12% to 16% soluble protein, and 78% to 85% made up largely of soluble carbohydrates (maltose and dextrins), together with the water-soluble B vitamines present in the original corn germ starting material.

When wheat germ is used as the starting material, the approximate formula of the resulting product is about 5% to 6% mineral salts, 15% to 20% soluble protein, and 75% to 80% made up largely of soluble carbohydrates (maltose and dextrins), together with the water-soluble B vitamines contained in the original wheat germ starting material.

In some instances, other raw materials, high in protein, such as alfalfa, may be incorporated in the batch, as, for instance, by chopping up the alfalfa and mixing it with the rice polishings or the cereal germs, or the like. In view of the small amount of sugar obtainable from alfalfa, however, it is desirable to limit the quantity employed in making up the batch, although the proportion of vitamines present in alfalfa is sufficient to contribute very materially to the vitamine content of the product.

Instead of saccharifying the extract of the raw material by malting it, as hereinbefore described, the saccharification may be effected by means of a suitable acid, organic or inorganic, as, for instance, hydrochloric acid, sulfuric acid, phosphoric acid, citric acid, tartaric acid, or the like; in which case, the sugars present in the product will consist in large part of glucose and dextrins. The product will, of course, likewise contain a large proportion of soluble proteins and mineral salts.

In the manufacture of leavened bread, sugar, in some form, (as, for instance, cane sugar, malt sugars, glucose and sometimes honey) is incorporated in the dough batch for four main reasons, to wit: (1) to provide food for the yeast so that it can leaven the dough, (2) to produce a golden brown color ("bloom") on the crust of the loaf, (3) to improve the flavor of the bread, and (4) to help the bread retain its freshness, i. e., to keep it from getting stale as quickly as would otherwise be the case. It is found that the sugary material, obtained as hereinbefore described, will take the place, pound for pound, of the sugars ordinarily employed, and will produce a superior loaf of bread,—better in flavor, more palatable, less liable to become stale within a given time, and more nutritious because of the presence of the water-soluble B vitamines in such large percentage in the sugary material and consequently in the bread in which it is incorporated. Furthermore, as above indicated, the "bloom" is uniform and satisfactory in leavened bread made by the employment of the sugary material herein described.

In making up the dough batch we preferably use between 5 and 10 pounds of the sugary material for every 100 pounds of flour. The resultant loaf of bread while having all the characteristics of the best baker's white bread, will contain a greater quantity of water soluble B vitamines than contained in bread made from whole wheat flour from which none of the bran or wheat germ has been removed.

As hereinbefore indicated, the sugary material may be concentrated to dryness. For convenience of storage, transportation, and sale, concentration to dryness (that is to say, to the dryness of ordinary sugar) is preferred. Nevertheless, in some cases, particularly where the material is to be promptly used in the bread manufacture, and is not subjected to deteriorating influences, it will be feasible to concentrate it merely to the form of a syrup, or even to a lesser degree where the conditions determining its use are favorable.

It is even feasible, though usually to less advantage, to obtain a product containing all of the water-soluble B vitamines of the original raw materials here specified, and with a notable sugar content by subjecting the raw materials to extraction by water or by alcohol, and subsequently concentrating the liquor thus obtained. For instance, wheat germs, after dissolving out the oil therefrom may be extracted by agitating the germ with water at a temperature of about 140° Fahrenheit for a period of three hours, a yield of sugar material of from 40% to 45% being obtained, which material will contain the water-soluble B vitamines present in the original stock treated. So also, by extracting wheat germs (from which the oil has first been dissolved out) by a mixture of equal parts of water and ethyl alcohol, by volume, a yield of 25% is obtained containing the water-soluble B vitamines of the original material. These yields, although less in amount represent, nevertheless, commercial results available for the uses and purposes of this invention; inasmuch as they put at the disposition of the user a sugary material high in water-soluble B vitamines and in mineral salts and rich in protein. While we prefer to cook the raw materials and to saccharify and digest them as hereinbefore described, it will be understood, therefore, that we contemplate as broadly within the scope of our invention the employment in the manufacture of leavened bread of the product obtained from water extraction and alcohol extraction as noted. When the sugary product is made by the water or alcohol extraction method, we will use an amount, in the manufacture of the finished loaf, which will be an equivalent in vitamine content of that produced by the malting or acid saccharifying method, as will be readily understood.

It will of course be understood that we may add to the bread other vitamine-containing substances and nutritive material if desired. For instance, milk in large quantities may be added with advantage to the bread and other substances and extracts may be employed. We do not, however, claim in this application a loaf of bread containing all the ingredients necessary for a balanced ration or a complete food for human consumption as that is not of our joint invention. We also do not make claim in this application to our improved vitamine containing extract or the method of its manufacture, as that invention forms the subject matter of our copending application Serial No. 504,693, filed Oct. 1, 1921.

What we claim is:

1. As an improvement in the manufacture of leavened bread, a bread loaf of the standard whiteness of crumb, uniformity of texture, and springiness, characteristic of the modern commercial bakery product made from highly milled bolted flour, said loaf containing in addition to its usual constituents, added water soluble B vitamines obtained by concentration of vegetable materials high in such vitamines; substantially as described.

2. As an improvement in the manufacture of leavened bread, a bread loaf of the standard whiteness of crumb, uniformity of texture, and springiness, characteristic of the modern commercial bakery products made from highly-milled bolted flour, said loaf containing in addition to its usual constituents, added water-soluble B vitamines obtained by extraction from vegetable materials high in such vitamines; substantially as described.

3. As an improvement in the manufacture of leavened bread, a bread loaf of the standard whiteness of crumb, uniformity of texture, and springiness, characteristic of the modern commercial bakery product made from highly-milled bolted flour, said loaf containing in addition to its usual constituents, added water-soluble B vitamines associated with soluble nitrogen compounds, obtained by extraction from vegetable material high in water-soluble B vitamines and protein; substantially as described.

4. As an improvement in the manufacture of leavened bread, a bread loaf of the standard whiteness of crumb, uniformity of texture, and springiness, characteristic of the modern commercial bakery product made from highly-milled bolted flour, said loaf containing in addition to its usual constituents, added water-soluble B vitamines associated with soluble nitrogen compounds and mineral salts, obtained by extraction from vegetable material high in water-soluble B vitamines, protein and mineral salts; substantially as described.

5. As an improvement in the manufacture of leavened bread, a bread loaf of the standard whiteness of crumb, uniformity of texture, and springiness, characteristic of the modern commercial bakery product made from highly-milled bolted flour, said loaf containing in addition to its usual constituents, added water-soluble B vitamines obtained by extraction from the boltings of cereals; substantially as described.

6. As an improvement in the manufacture of leavened bread, a bread loaf of the standard whiteness of crumb, uniformity of texture, and springiness, characteristic of the modern commercial bakery product made from highly-milled bolted flour, said loaf containing in addition to its usual constituents, added water-soluble B vitamines obtained by extraction from cereal germs; substantially as described.

7. As an improvement in the manufacture of leavened bread, a bread loaf of the standard whiteness of crumb, uniformity of texture, and springiness, characteristic of the modern commercial bakery product made from highly-milled bolted flour, said loaf containing in addition to its usual constituents, added water-soluble B vitamines obtained by extraction from wheat germs; substantially as described.

In testimony whereof we affix our signatures.

CHARLES HOFFMAN.
HARRY DAVETT GRIGSBY.
NATHAN MINTON CREGOR.